United States Patent
Chambers et al.

(10) Patent No.: US 11,730,297 B2
(45) Date of Patent: *Aug. 22, 2023

(54) INTEGRATED PACKAGE AND MAIL DELIVERY SECURITY SYSTEM

(71) Applicant: IMDSS Solutions LLC, Ashburn, VA (US)

(72) Inventors: Cynthia Lee Chambers, Ashburn, VA (US); Steven James Frederickson, Leesburg, VA (US)

(73) Assignee: IMDSS Solutions LLC, Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,387

(22) Filed: Oct. 11, 2021

(65) Prior Publication Data

US 2022/0022679 A1 Jan. 27, 2022

Related U.S. Application Data

(63) Continuation of application No. 16/876,447, filed on May 18, 2020, now Pat. No. 11,141,015, which is a
(Continued)

(51) Int. Cl.
*A47G 29/30* (2006.01)
*E05B 65/52* (2006.01)
(Continued)

(52) U.S. Cl.
CPC ........... *A47G 29/30* (2013.01); *A47G 29/141* (2013.01); *E05B 39/04* (2013.01); *E05B 47/02* (2013.01);
(Continued)

(58) Field of Classification Search
CPC ........ A47G 2029/144; A47G 2029/145; A47G 2029/149; A47G 29/141; A47G 29/30;
(Continued)

(56) References Cited

U.S. PATENT DOCUMENTS 5,476,220 A 12/1995 Cohoon
5,509,603 A 4/1996 Hering
(Continued)

FOREIGN PATENT DOCUMENTS

| AU | 2004100832 A4 | 11/2004 |
|---|---|---|
| CN | 102949074 A | 3/2013 |
| WO | WO 2014/137617 A1 | 9/2014 |

OTHER PUBLICATIONS

International Patent Application No. PCT/IB2017/058377International Search Report dated Apr. 6, 2018, 19 Pages [Cited in related U.S. Appl. No. 15/389,867].
(Continued)

*Primary Examiner* — Nader Bolourchi
(74) *Attorney, Agent, or Firm* — BakerHostetler

(57) ABSTRACT

A system for securely depositing an item includes: a deposit box with a door configured to provide selective access to an interior space in the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; and a first transmitter operatively connected to the lock mechanism and configured to transmit a signal indicative of operating information regarding the lock mechanism.

20 Claims, 10 Drawing Sheets

Related U.S. Application Data continuation of application No. 16/251,799, filed on Jan. 18, 2019, now Pat. No. 10,653,263, which is a continuation of application No. 15/479,525, filed on Apr. 5, 2017, now Pat. No. 10,512,353, which is a continuation of application No. 15/389,867, filed on Dec. 23, 2016, now Pat. No. 10,039,400.

(51) Int. Cl.

| | | |
|---|---|---|
| *E05B 39/04* | (2006.01) | |
| *E05B 47/02* | (2006.01) | |
| *A47G 29/14* | (2006.01) | |
| *G06Q 10/083* | (2023.01) | |
| *E05B 17/10* | (2006.01) | |
| *E05B 47/00* | (2006.01) | |

(52) U.S. Cl.
CPC ........ *E05B 65/52* (2013.01); *A47G 2029/144* (2013.01); *A47G 2029/145* (2013.01); *A47G 2029/149* (2013.01); *E05B 17/10* (2013.01); *E05B 2047/0094* (2013.01); *G06Q 10/083* (2013.01)

(58) Field of Classification Search
CPC .. E05B 17/10; E05B 2047/0094; E05B 39/04; E05B 47/02; E05B 65/52; G06Q 10/083
See application file for complete search history.

(56) References Cited

U.S. PATENT DOCUMENTS

| | | |
|---|---|---|
| 6,987,452 B2 | 1/2006 | Yang |
| 7,931,189 B2 | 4/2011 | Kalenburg |
| 8,339,261 B1 | 12/2012 | Wolski |
| 8,643,511 B1 | 2/2014 | Batterson |
| 9,619,955 B2 | 4/2017 | Eichenblatt |
| 10,039,400 B2 | 8/2018 | Chambers et al. |
| 10,736,451 B2 | 8/2020 | Chambers et al. |
| 2002/0005774 A1 | 1/2002 | Rudolph et al. |
| 2003/0061395 A1 | 3/2003 | Kingsbury et al. |
| 2007/0257772 A1 | 11/2007 | Marcelle et al. |
| 2008/0121682 A1 | 5/2008 | Grim et al. |
| 2014/0138440 A1 | 5/2014 | D'Ambrosio et al. |
| 2015/0186840 A1 | 7/2015 | Torres et al. |
| 2016/0180618 A1 | 6/2016 | Ho et al. |
| 2016/0335822 A1 | 11/2016 | Ogishi et al. |

OTHER PUBLICATIONS

International Patent Application No. PCT/IB2017/058377 Written Opinion of the International Searching Authority (WOISA), dated Mar. 18, 2018 (Year: 2018) [Cited in related U.S. Appl. No. 15/479,525].

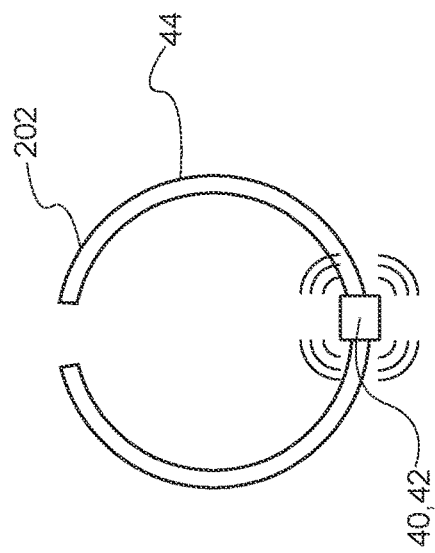
FIG. 4
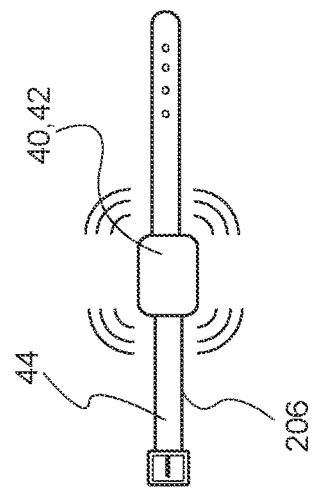
FIG. 6
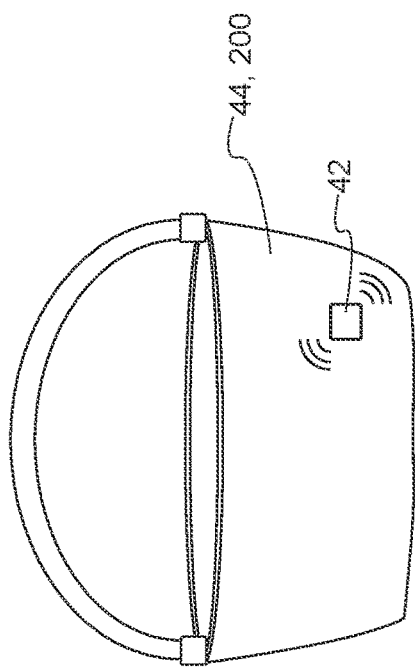
FIG. 3
FIG. 5

INTEGRATED PACKAGE AND MAIL DELIVERY SECURITY SYSTEM

CROSS-REFERENCE TO RELATED APPLICATIONS

This application claims priority to, and is a continuation, of U.S. patent application entitled, INTEGRATED PACKAGE AND MAIL DELIVERY SECURITY SYSTEM, filed May 18, 2020, having a Ser. No. 16/876,447, now U.S. Pat. No. 11,141,015, the disclosure of which is hereby incorporated by reference in its entirety; a continuation, of U.S. patent application entitled, INTEGRATED PACKAGE AND MAIL DELIVERY SECURITY SYSTEM, filed Jan. 18, 2019, having a Ser. No. 16/251,799, now U.S. Pat. No. 10,653,263, the disclosure of which is hereby incorporated by reference in its entirety; which is a continuation, of U.S. patent application entitled, INTEGRATED PACKAGE AND MAIL DELIVERY SECURITY SYSTEM, filed Apr. 5, 2017, having a Ser. No. 15/479,525, now U.S. Pat. No. 10,512,353, the disclosure of which is hereby incorporated by reference in its entirety; which is a continuation, of U.S. patent application entitled, INTEGRATED PACKAGE AND MAIL DELIVERY SECURITY SYSTEM, filed Dec. 23, 2016, having a Ser. No. 15/389,867, that issued as U.S. Pat. No. 10,039,400 on Aug. 7, 2018, the disclosure of which is hereby incorporated by reference in its entirety.

TECHNICAL FIELD

The present disclosure relates generally to a system and method for securely delivering packages and correspondence. More particularly, the present disclosure relates to a system and method for limiting access to a secured delivery box to a delivery person and a system user associated with the delivery box.

BACKGROUND

Everyday delivery services deliver sensitive mail to over 155 million delivery locations, most of which are filled with unsecured, or minimally secured, public access mailboxes. Every day, sensitive, personal data is left unattended in these publicly accessible mailboxes, with no or little security. The mailboxes even have raised red flags to publicize to criminals that personal, valuable data could be sitting in these unsecured boxes waiting to be taken. This security weakness has been inherent in the mail and package delivery model since the inception of the mail delivery system.

Furthermore, modern delivery services often have excellent tracking systems to track where mail, packages or other things to be delivered are in the delivery system. However most or all these systems lack the ability to actually track if mail or packages are located in a mailbox or other deposit type receptacle.

Accordingly, it is desirable to provide a system or method and apparatus that can allow mail, packages, or other items that are delivered to be deposited in a more secure location and allow tracking of whether the item is deposited within the mailbox or other deposit receptacle.

SUMMARY

The present disclosure describes a system for securely depositing an item including: a deposit box having walls, a floor, and top that defines an interior space within the deposit box and a door configured to provide selective access between the interior space in the deposit box and an exterior of the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; and a first transmitter operatively connected to the lock mechanism and configured to transmit a signal indicative of operating information regarding the lock mechanism, and wherein the deposit box is at least 18 inches wide and 24 inches long.

The present disclosure also describes, a method of making a secure delivery including: unlocking a delivery box by activating a first proximity sensor operatively connected to a lock mechanism by moving a second proximity sensor near the first proximity sensor, wherein the second proximity sensor is mounted to a piece of delivery equipment, wherein the first and second proximity sensors have been registered to a delivery box user and a delivery service respectively; depositing a delivery item associated with the delivery box in the delivery box or in a bag associated with the delivery box; and moving the second proximity sensor away from the first proximity sensor, and wherein the delivery box is at least 18 inches wide and 24 inches long.

The present disclosure also describes, a system for securely depositing an item including: a deposit box having walls, a floor, and top that defines an interior space within the deposit box and a door configured to provide selective access between the interior space in the deposit box and an exterior of the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; a first transmitter operatively connected to the lock mechanism and configured to transmit a signal indicative of operating information regarding the lock mechanism; a bag, the bag having an attaching member configured to attach to a securing member located in the interior space; and a passageway in the deposit box sized and dimensioned to allow the attaching member to pass through the passageway to attach to the securing member in the interior space when the bag is outside of the interior space.

BRIEF DESCRIPTION OF THE DRAWINGS

FIG. 3 is a front view of a mailbag that may be used in accordance to the system of FIG. 1.

FIG. 4 is a top view of a necklace or bracelet containing a proximity sensor that may be used in accordance with the system of FIG. 1.

FIG. 5 is a top view of a key chain containing a proximity sensor that may be used in accordance with the system of FIG. 1.

FIG. 6 is a top view of a watch containing a proximity sensor that may be used in accordance with the system of FIG. 1.

DETAILED DESCRIPTION

Figure 1:
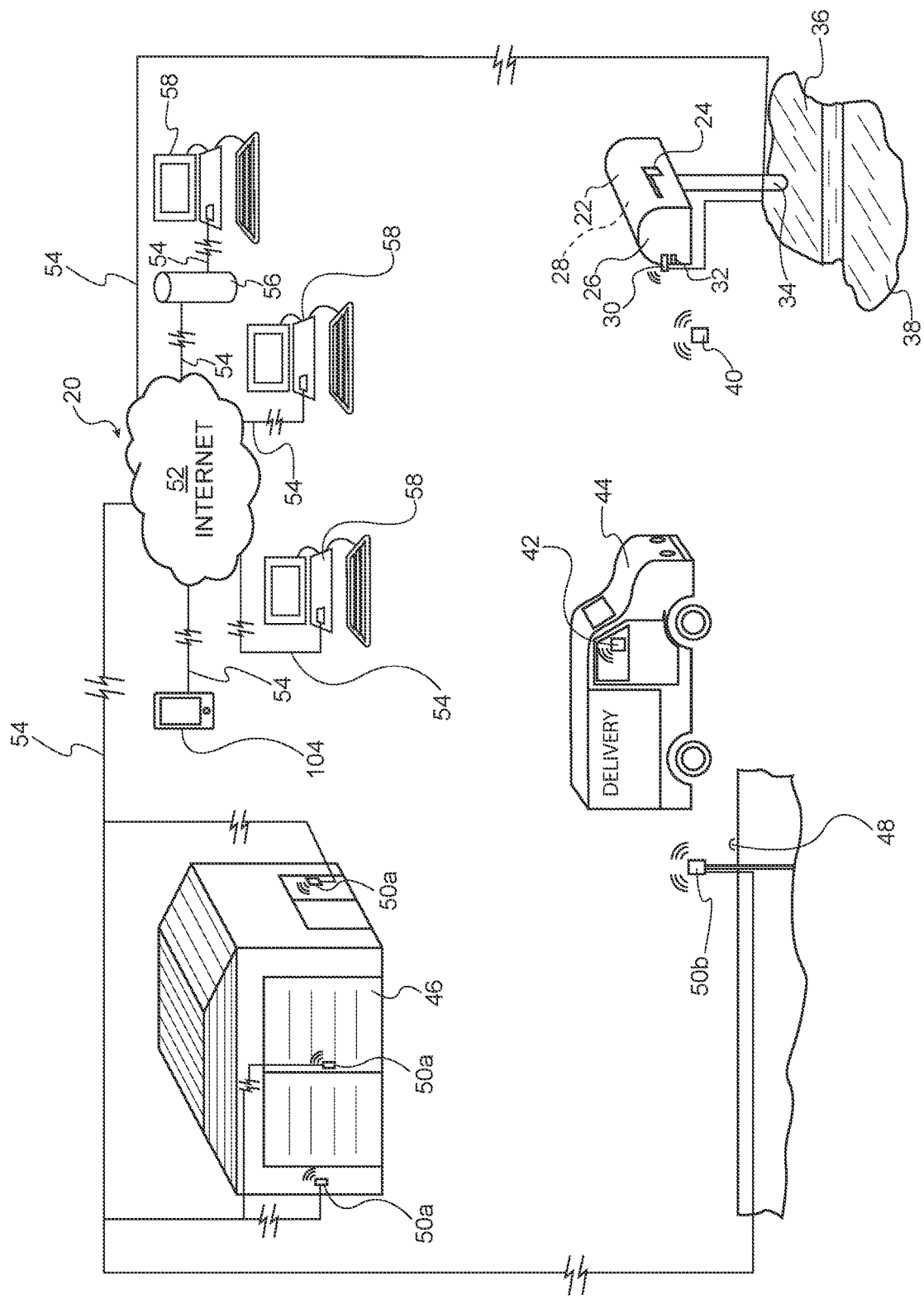
FIG. 1 is a schematic diagram of a system for depositing delivery items in a secure manner and tracking whether the item has been deposited in the receptacle in accordance with the present disclosure.

An example, non-limiting embodiment in accordance with the invention will now be described with reference to the drawing figures, in which like reference numerals refer to like parts throughout. It should be understood that the drawings are not to scale, An embodiment in accordance with the present disclosure provides a system, method, or apparatus that that can allow mail or other items that are delivered to be deposited in a secure location and allow tracking of whether the item is deposited in the mailbox or other deposit receptacle.

An embodiment of the present inventive system is schematically shown in FIG. 1. FIG. 1 illustrates a system 20 that allows an item to be delivered in a relatively secure location and that item to be tracked as well as the status of the deposit box being monitored.

As shown in FIG. 1, a deposit box 22 may include an indicator 24 such as a flag 24 to indicate to a delivery person whether there is an item in the deposit box 22 to be picked up. The deposit box 22 may include a door 26 that provides selective access to an enclosed space 28 located within the deposit box 22. The deposit box 22 may be made of steel, aluminum, or any other metal, metal alloy, plastic, resin, polymer, fiberglass or other suitable substance. The deposit box 22 may include a box proximity sensor 30 which may be operatively connected to a locking mechanism 32. The deposit box 22 may be mounted upon a box support 34 which may be mounted to or set in the ground 36. The deposit box 22 may be located adjacent to a street or road 38.

In some embodiments, the box proximity sensor 30 is able to detect if another appropriately authorized proximity sensor 40, 42 is nearby. If an appropriately authorized sensor 40 or 42 is near the box proximity sensor 30, then the box proximity sensor 30 can send a control signal to the locking mechanism 32 to unlock which will allow the door 26 to be opened to provide access to the enclosed space 28. The box proximity sensor 30 may also have a transceiver that allows the box proximity sensor 30 to send/receive signals to and from the system 20. Furthermore, when there are no authorized proximity sensors 40 or 42 near the box proximity sensor 30, then the locking mechanism 32 will move to its defaulted, locked state.

The system 20 may include a piece of delivery equipment 44. As shown in FIG. 1, the delivery equipment 44 is a delivery vehicle. The delivery vehicle 44 may be equipped with an authorized proximity sensor 42 which may communicate with the box proximity sensor 30 when the authorized proximity sensor 42 is located near the box proximity sensor 30. As a result, a delivery person operating the delivery vehicle 44 need only drive or maneuver the delivery vehicle 44 near the deposit box 22 to cause the deposit box 22 to be in an unlocked state. The delivery person need not fumble with keys or any other devices in order to unlock the deposit box 22. Rather, merely maneuvering the delivery equipment 44 (which is shown in FIG. 1 to be a vehicle but other delivery equipment may also be used which will be discussed later below) near the deposit box 22 unlocks the deposit box 22. Further, moving the delivery equipment 44 away from the deposit box 22 will cause the deposit box 22 to be an locked state. Therefore, the delivery person need not perform any extra function to lock or unlock the deposit box 22 other than what the delivery person would already do when making a deposit within a regular non-secured deposit box.

When a user such as the owner or other person associated with the deposit box 22 wants to access the deposit box 22 to retrieve a piece of mail, package, or other article, the user may use the user's proximity sensor 40 and bring it near the box proximity sensor 30 causing the box proximity sensor 30 to send a signal to the locking mechanism 32 to unlock and allow the door 26 of the deposit box 22 to open to thereby provide access to the enclosed space 28. When the user moves away from the deposit box 22 the user's proximity sensor 40 will move out of range and no longer be able to communicate with the box proximity sensor 30 which will cause the locking mechanism 32 to move to its default locking position.

In some embodiments, and as shown in FIG. 1, a delivery operation may have a home base 46 which may be a place or building where the equipment 44 may be stored and/or loaded with items to be delivered. In some embodiments this may be a local or regional post office.

The base or building 46 may be associated with a boundary or property line 48. In some embodiments, when the delivery vehicle 44 leaves the budding 46 building proximity sensors 50A detects when the proximity sensor 42 on the delivery vehicle 44 leaves the budding 46. In other embodiments, a boundary line proximity sensor 50B can detect when the proximity sensor 42 on the delivery vehicle 44 leaves the property boundary 48.

When the proximity sensors 50A or 50B detect that the delivery proximity sensor 42 has left either the budding 46 or the property boundary 48 they may send a signal via connectors 54 which may be wired or wireless through the Internet 52 or other communications system to a server or database 56. The server or database 56 can save data regarding the movement of the proximity sensor 42, In this way, the date and time of when the proximity sensor 42 left the base 46 or property 48 may be monitored and stored. Conventional or other delivery tracking systems may be used to generate information and/or data to be stored on the server or database 56 so that the delivery proximity sensor 42 may be associated with data such as which delivery articles are located on the delivery vehicle 44. In some embodiments, signals may be sent to a user to indicate that a delivery article associated with a user has left the delivery facility 46 or property 48 and is out for delivery.

Users of the system 20 may use various computers (PCs) 58 which may be connected either wirelessly are wired by connections 54 through the Internet 52 or other communications system to the database or server 56 in order to retrieve data is saved on the server 56 or to receive signals, emails, texts or other messages providing them updates with respect to items to be delivered to their delivery receptacles 22.

In addition to various computers personal computers (PCs) 58, users may access the system 20 using a wireless device 104. The wireless device 104 may also be connected via a wired or wireless connection 54 to the Internet 52 or other communication systems to the database or server 56. It should be understood that the various proximity sensors 30, 40, 42, 50A, and 50B may include transceivers which allow the proximity sensors 30, 40, 42, 50A and 503 to communicate with other aspects of the system 20 such as the server/database 56. It should be understood that none, some, or all of the access, communication, and data storage that occurs over the system 20 is securely protected and may be encrypted.

Figure 2:
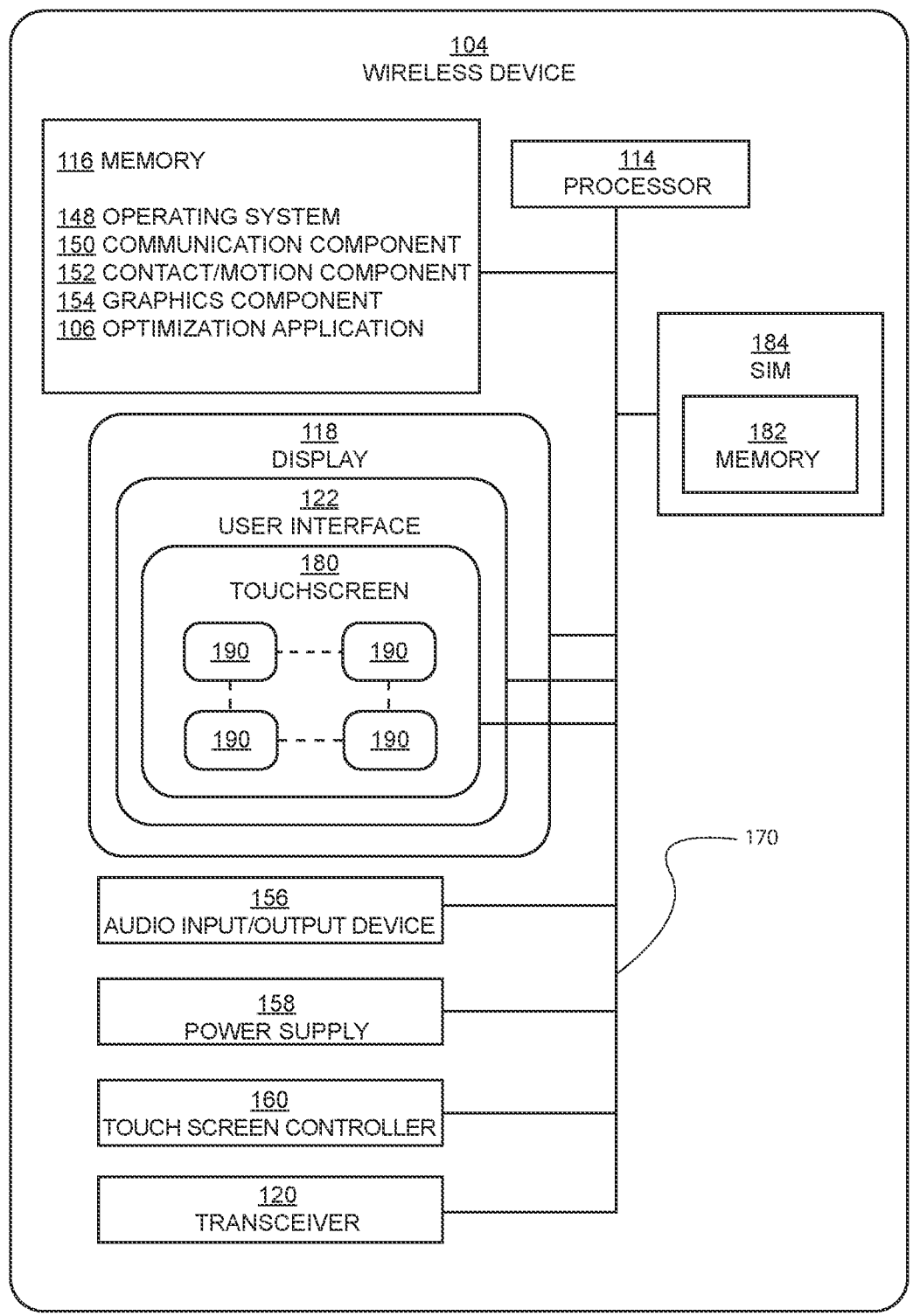
FIG. 2 is a schematic drawing of a wireless device that may be used with the system of FIG. 1.

FIG. 2 illustrates a device 104 in accordance with an aspect of the disclosure. In this regard, the disclosure may be implemented in conjunction with a wireless device 104 executing the wireless service optimization application 106. The wireless device 104 includes a memory 116. The wireless device 104 may further include an operating system 148, a communication component 150, a contact/motion component 152, a graphics component 154, and the like. The operating system 148 together with the various components provides software functionality for each of the components of the wireless device 104, The memory 116 may include a high-speed, random-access memory. Also, the memory 116 may be a non-volatile memory, such as magnetic fixed disk storage, flash memory or the like. These various components may be connected through various communication lines including a data bus 170. The memory 116 may also store device related information including but not limited to a device serial number, such as, for example, an International Mobile Equipment Identify (WEI), an Electronic Serial Number (ESN), Mobile Equipment Identifier (MEID), and/or the like.

In another aspect of the disclosure, the memory 116 of a wireless device 104 includes a database for storing user information. The user information may include further information as required by the service provider and may include information such as full name, address, date of birth, telephone number, service provider, email address, contact number, credit card information, and the like. In one aspect, the database may include security questions. In another aspect, the database may include user specified preferences.

The wireless device 104 may also include a SIM card 184 having a memory 182. The memory 182 stores the SIM card serial number, and may be implemented as, for example, an integrated Circuit Card ID (ICCID). Aspects of the disclosure may be equally applicable to wireless devices 104 that are implemented without a SIM card 184 having a memory 182.

The wireless device 104 also includes a processor 114 which may be a central processing unit configured to execute instructions, such as, for example, instructions related to software programs. Any processor can be used for the wireless device 104 as understood by those of ordinary skill in the art. The processor 114 may be coupled to the user interface 122, the SIM card 184 and the memory 116. The display 118 may be a liquid crystal display (LCD) or any other suitable display. Preferably the LCD includes a backlight to illuminate the various color liquid crystals to provide a more colorful display. The user interface 122 may be any type of physical input as readily employed in the field. For example, the user interface may have physical buttons. Alternatively, the user interface may be implemented on a touchscreen 180. Additionally, the wireless device 104 includes a power supply 158. The wireless service optimization application 106 may be executed by the processor 114.

The wireless device 104 may include an audio input/output device 156. The audio input/output device 156 may include speakers, speaker outputs, microphones, microphone inputs, and the like, for receiving and sending sound inputs. In an exemplary aspect, the audio input/output device 156 may include an analog to digital converter and a digital to analog converter for audio input and output functions respectively.

In a further aspect, the wireless device 104 may include a transceiver 120. The wireless device 104 may provide radio and signal processing as needed to access a network for services in conjunction with the transceiver 120. The processor 114 may be configured to process call functions, data transfer, and the like and provide other services to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. The wireless device 104 may further include a touch screen controller 160.

In operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may have different implementations. The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images which appear on the display 118 in order to initiate functions and tasks associated therewith.

Any of the computers 58 may include all, some, or any other desirable features described above with respect to the wireless device 104. In some embodiments, programs or applications (apps) may be downloaded from the server or database 56 onto the wireless devices or computers 58 in order to allow a user to easily access information regarding the system 29. Alternatively, the programs or applications may reside or the database or server 56 and be accessed by a user via a wireless device 104 or computer 58.

Any of the wired or wireless connections 54, or other communication aspects of the disclosure, may include communication channels that may be any type of wired or wireless electronic communications network, such as, e.g., a mired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), COMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be implemented in any type of computing devices, such as, e.g., a desktop computer, personal computer, a laptop/mobile computer, a personal data assistant (FDA), a mobile phone, a tablet computer, cloud computing device, and the like, with wired/wireless communications capabilities via the communication channels.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SFS developed in the future, To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Aspects of the disclosure may include a server 56 executing an instance of an application or software configured to accept requests from a client and giving responses accordingly. The server 56 may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server 56 may include peripheral devices that may allow information to be retrieved from an external source, and the result of operations saved and retrieved. The server 56 may operate within a client-server architecture. The server 56 may perform some tasks on behalf of clients. The clients may connect to the server 56 through the network on a communication channel as defined herein. The server 56 may use memory with error detection and correction, redundant disks, redundant power supplies and so on.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein.

Multimedia Messaging Service (MMS) is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipients carrier using the Internet 52.

FIG. 3 illustrates another embodiment where the delivery equipment 44 is not a vehicle as shown in FIG. 1 but is rather a mail carrier's bag 200. The bag 200 is equipped with a delivery the proximity sensor 42 and operates in the same manner as the delivery proximity sensor 42 described in FIG. 1. In other words, all the delivery person needs to do is to approach the deposit box 22 and the delivery proximity sensor 42 will communicate with the box proximity sensor 30 cause the deposit box 22 to unlock. By walking away from the deposit box 22 the delivery proximity sensor 42 will no longer be proximate to the box proximity sensor 30 which will cause the locking mechanism 32 to default to its locking position. It should be understood that in some embodiments, that in order for the locking mechanism 32 to move to its defaulted, locked position, the door 26 must be closed.

FIGS. 4-6 illustrate various features that may be used by either a user or a delivery person to hold either the user's proximity sensor 40 or the delivery proximity sensor 42. As shown in FIG. 4, a necklace or bracelet 202 may act as the postal equipment 44 to hold the delivery proximity sensor 42. The bracelet or necklace 202 may be worn by the delivery person. In other embodiments, the necklace or bracelet 202 can be used or worn by the user and contain the user's proximity sensor 40.

As shown in FIG. 5, a key ring 204 may act as the postal equipment 44 to hold the delivery proximity sensor 42. The key ring 204 may be carried by the delivery person. In some embodiments, a key ring 204 can be used or carried by the user and contain the user's proximity sensor 40.

As shown in FIG. 6, a watch 206 may act as the postal equipment 44 to hold the delivery proximity sensor 42. The watch 206 may be worn by the delivery person. In some embodiments, a watch 206 can be used or worn by the user and contain the user's proximity sensor 40.

Figure 7:
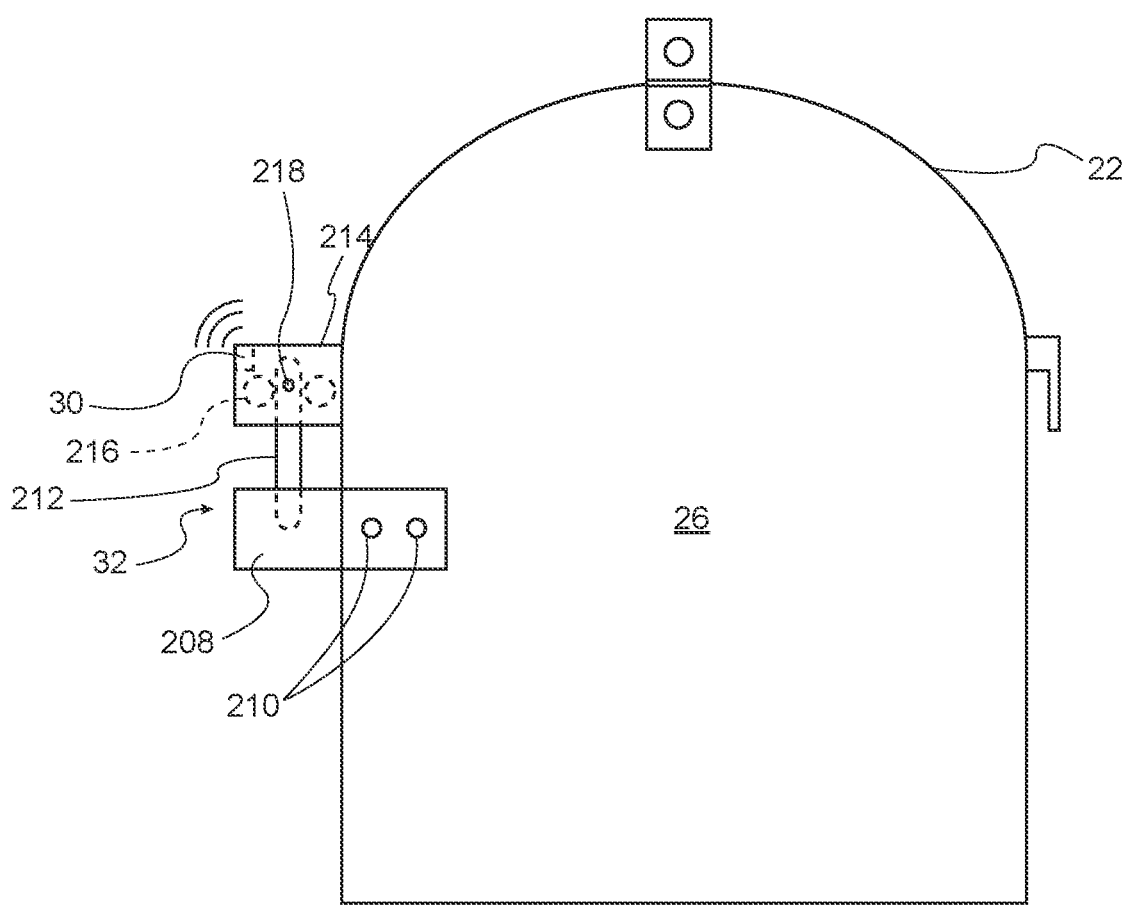
FIG. 7 is a front view of a mailbox having an external locking system.
Figure 8:
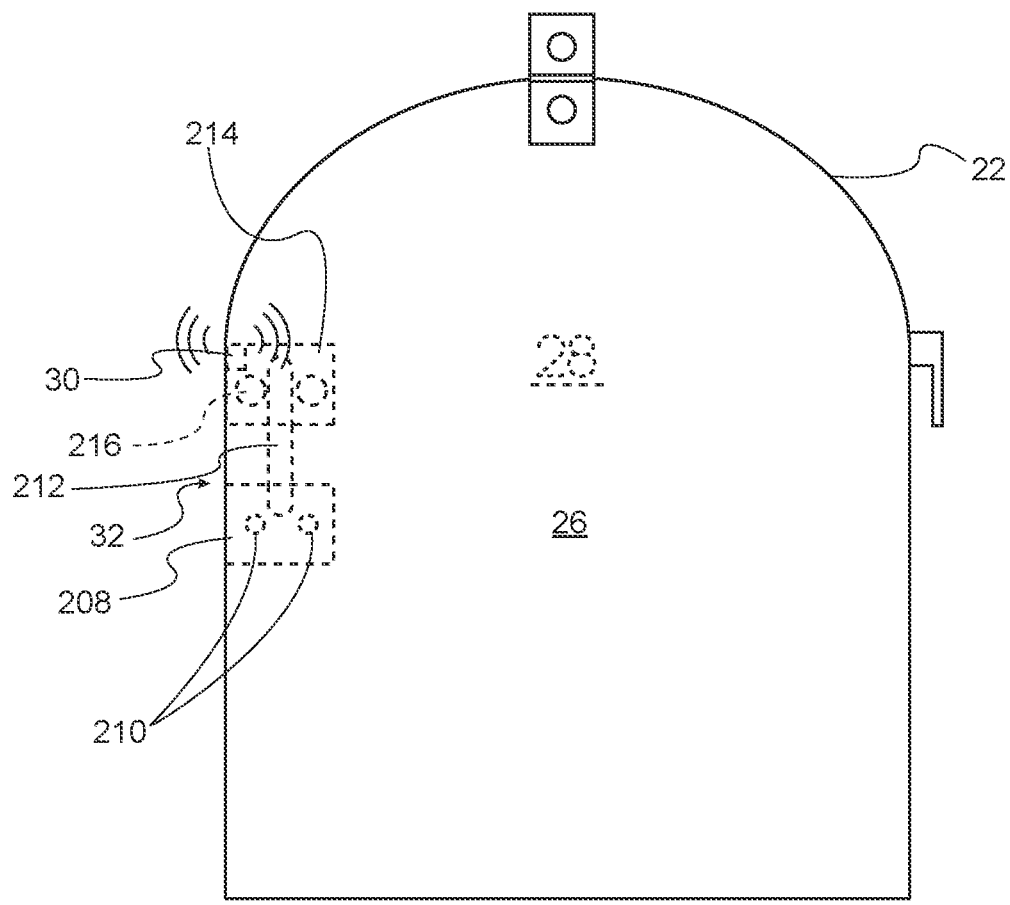
FIG. 8 is a front view of a mailbox having an internal locking system.

FIG. 7 is a front view of a deposit box 22 in accordance with the present disclosure. The locking mechanism 32 of FIG. 7 is shown external to the deposit box 22. FIG. 8 is another embodiment where the locking mechanism 32 shown internally and in the enclosed space 28 of the deposit box 22. While the position of the locking mechanism 32 is shown herein as an example it will be understood that various different locking mechanism 32 may be employed and located at various positions and are on or in the deposit box 22.

With reference to FIGS. 7 and 8, the locking mechanism 32 includes a lock receiver 208 which is attached to the door 26 via fasteners 210. In other embodiments, an adhesive, such as a high strength adhesive, may be used instead of, or in addition to, the fasteners 210 to attach the locking mechanism 32 to the deposit box 22. The lock receiver 208 receives a movable bolt 212. The movable bolt 212 retracts and extends in and out of the lock body 214 via a bolt moving mechanism 216. The locking mechanism 32 may be dimensioned so that when the door 26 is in a closed position the movable bolt 212 will fit into a recess within the lock receiver 208. A box proximity sensor 30 is operatively connected to the locking mechanism 32. The box proximity sensor 30 sends a signal to operate the locking mechanism 32 to move the movable bolt 212 position within the lock body 214 when the box proximity sensor 30 detects another authorized proximity sensor nearby. When no additional authorized proximity sensor is detected by the box proximity sensor 30, then the locking mechanism 32 will revert to its defaulted locked position. In other embodiments, the default position of the locking mechanism 32 may be an unlocked position.

The locking mechanism 32 may also include a status light 218 which, in some embodiments, may be an LED light. The status light 218 may display various colors or simply be illuminated or not to indicate the locking mechanism 32 status. In some embodiments, when the locking mechanism 32 is not in a locked condition, the status light 218 may be not illuminated or illuminating a color indicating that the locking mechanism 32 is not locked. When the locking mechanism 32 is in a locked condition, then the status light 218 may be illuminated or display a color indicating that the locking mechanism 32 is in a locked condition. Power for the locking mechanism 32, the status light 218, and/or the proximity sensor 30 may include a battery, a connection to line voltage, a solar cell or any other suitable power source.

Figure 9:
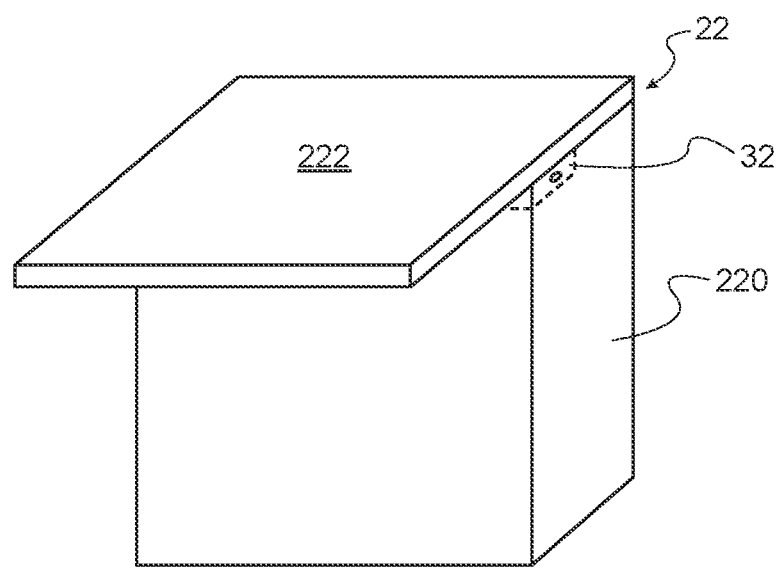
FIG. 9 is a perspective view of a larger deposit box having a locking system.

In some embodiments, it may be desirable to have a large deposit box 220 which may be sized to accommodate larger packages and not just mail or other document deliveries as shown in FIG. 9. The large deposit box 220 may have a locking mechanism 32 secure the lid 222 and the body 220 in a similar manner as discussed above with respect to FIGS. 7 and 8. In some embodiments, the larger deposit box 220 may be sized 18"×24." Other embodiments may use different sizes. The large deposit box 220 may be attached directly to a user's home, the ground, or other building.

Figure 10A:
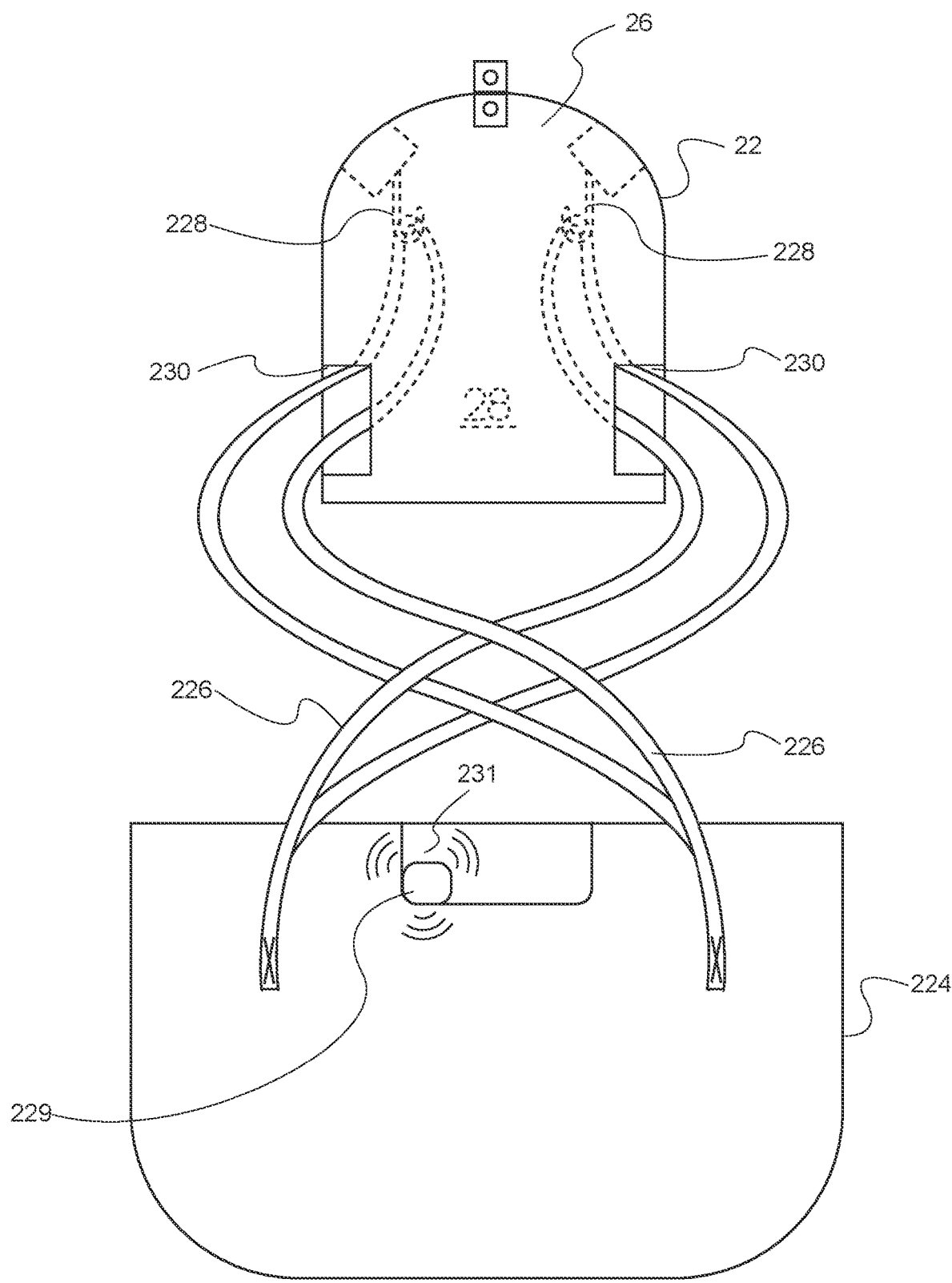
FIG. 10A is a front view of a deposit bag attached to a delivery box in accordance with the present disclosure.
Figure 10B:
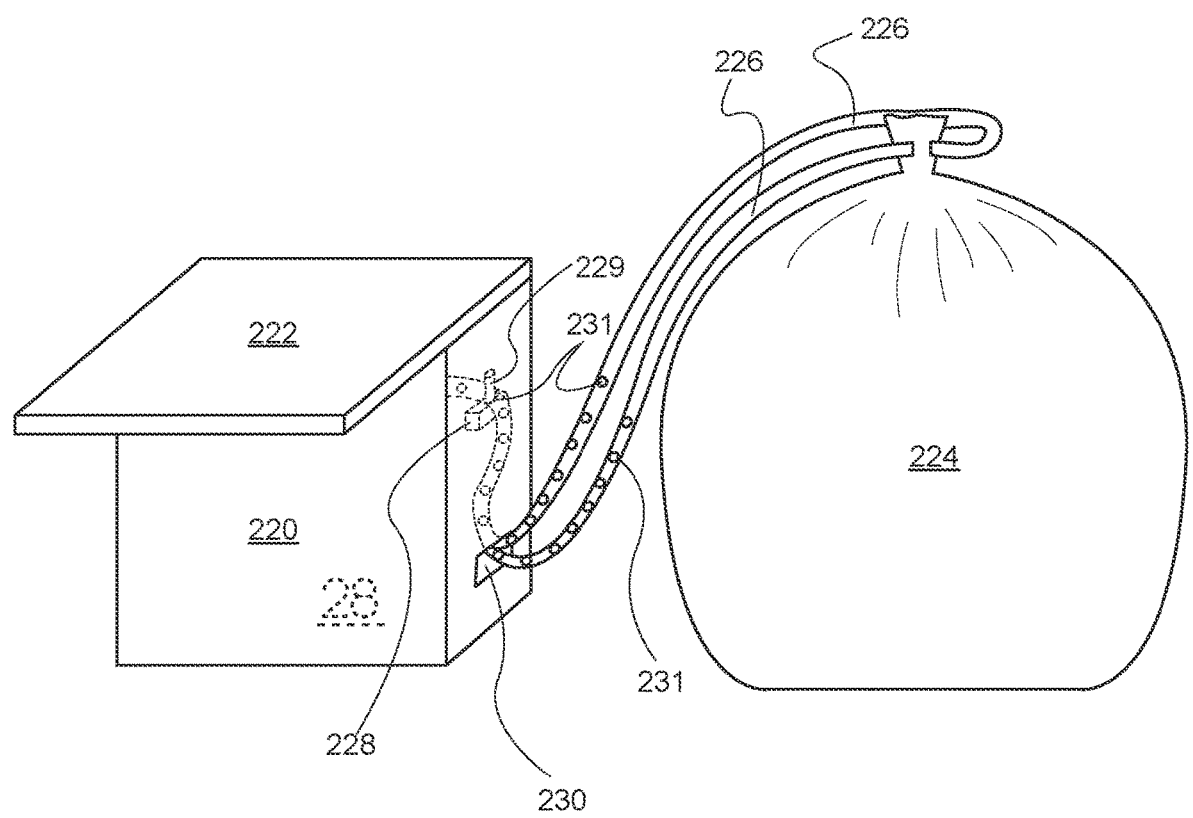
FIG. 10B is a perspective view of a larger deposit box having a deposit bag attached to a delivery box in accordance with the present disclosure.

FIGS. 10A and 10B illustrate additional embodiments that may be used for delivering items larger than the deposit box 22 or 220. In the embodiment illustrated in FIGS. 10A and 10B, the deposit box 22 or 220 may include a flexible deposit bag 224. The deposit bag 224 may assist in keeping a delivery protected from weather (particularly, but not limited to, precipitation, and ground moisture) as well as keeping the item secure. The deposit boxes 22, 220 may also be configured to protect delivery items from weather as well as keeping the item secure.

The flexible deposit bag 224 may be kept in the deposit box 22, 220 when not in use. There may be a slot or other structure in the deposit box 22, 220 or storing the deposit bag 224. The flexible deposit bag 224 may be made of a waterproof or water resistant nylon, plastic, canvas, or other suitable material. The bag 224 may be equipped with straps 226 which may fit through passageways 230 into the interior enclosed space 28 to fit on securing hooks (as shown in FIG. 10A) or other securing structure 228. In the embodiment shown in FIG. 10B, the bag is cinched closed with the securing straps 226 and the securing straps 226 have holes 231 which may fit over a post 229 which may be part of the securing structure 228. By using either of these ways, or any in other suitable manner, the bag 224 can be secured within the deposit box 22, 220. When the door 26, 222 of the deposit box 22 is opened, the straps 226 may be accessed to be removed from the securing structure 228 to provide access inside the bag 224. The item may be deposited in the bag 224 and the bag 224 cinched dosed or otherwise dosed. Then the securing straps 226 may be threaded through the passageways 230 and secured to the securing structure 228. The door 26, 222 may then be dosed and the deposit box 22, 220 may be locked thereby securing, the bag 224 to the deposit box 22, 220.

It should be understood that the type of securing structure 228 shown in FIG. 10A may also be used with the deposit box 220 of FIGS. 9 and 10B. Furthermore, the securing structure 228 of FIG. 10B may also be used with the smaller deposit box 22. The illustrated embodiments are exemplary and are not limiting. Various aspects of various embodiments may be mixed and matched among various embodiments.

In some embodiments, the bag 224 may be designed so it is difficult to open without removing the securing straps 226 from the securing structure 228. In other embodiments, a separate locking mechanism 231 may be attached to the deposit bag 224 to keep the bag 224 closed. Where a separate locking mechanism 231 is used, a proximity sensor (similar to the proximity sensors described above) may also be operatively connected to the locking mechanism 231 to provide selective access to the bag 224, so that the locking mechanism 231 may be accessed by a delivery person or user in a similar manner to the locking and unlocking of the deposit box 22, 220 that is described elsewhere herein.

It will be understood that deposit boxes 22, 220 in accordance with the present disclosure may be originally configured to have any or all the features of: the box proximity sensor 30, the locking mechanism 32, the bag 224, and passageways 230 or may be modified to have any or all these features. In some embodiments, kits may be provided to modify a standard mailbox or other structured to become a deposit box 22 220 in accordance with present disclosure. Such a kit may include any or all of the following: the box proximity sensor 30, the locking mechanism 32, and the bag 224, fasteners 210 and/or an adhesive.

Figure 11:
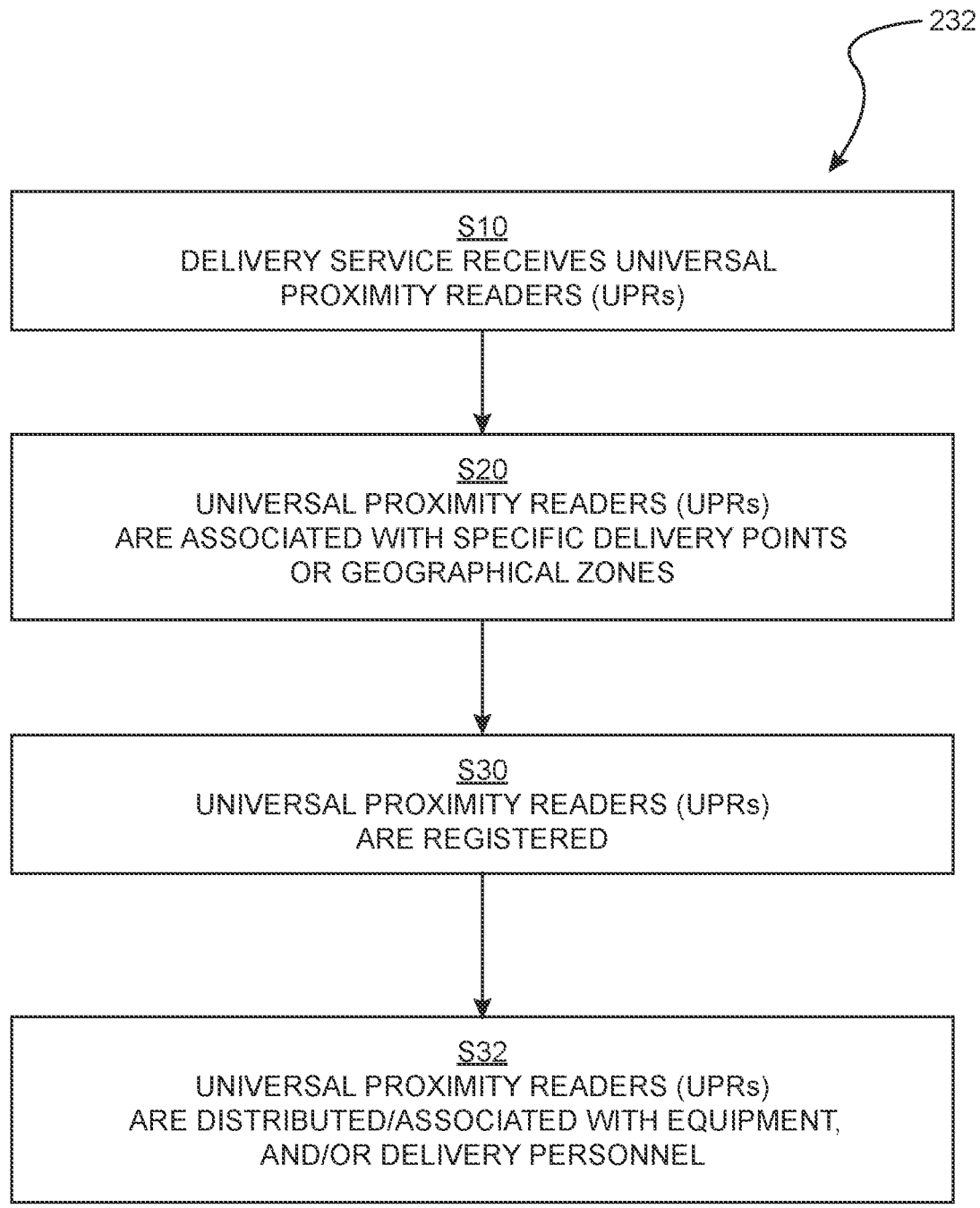
FIG. 11 is a flowchart illustrating a method of activating a universal proximity sensor in accordance with the present disclosure.
Figure 12:
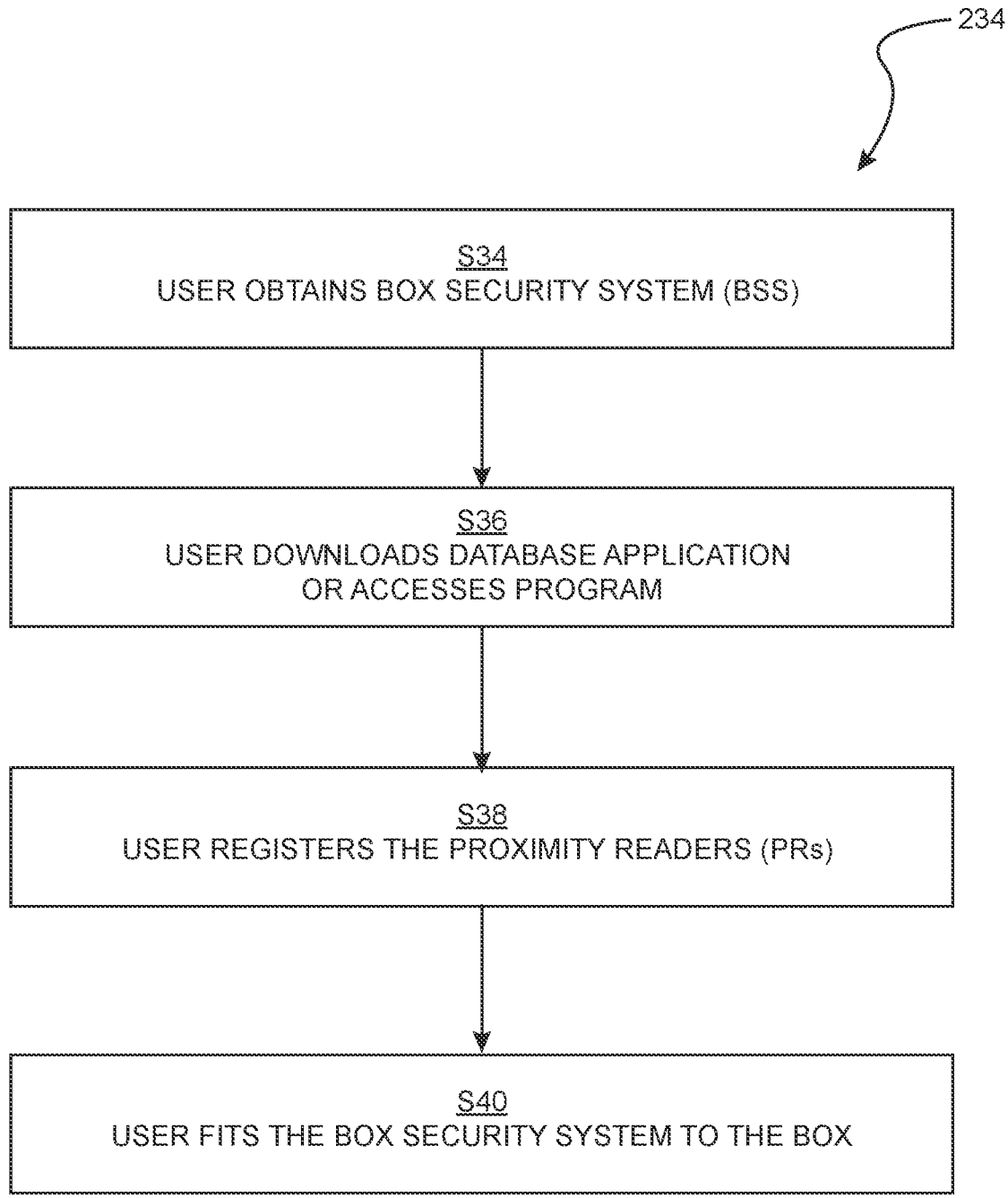
FIG. 12 is a flowchart illustrating a method of activating a proximity sensor attached to a deposit box in accordance with present disclosure.
Figure 13:
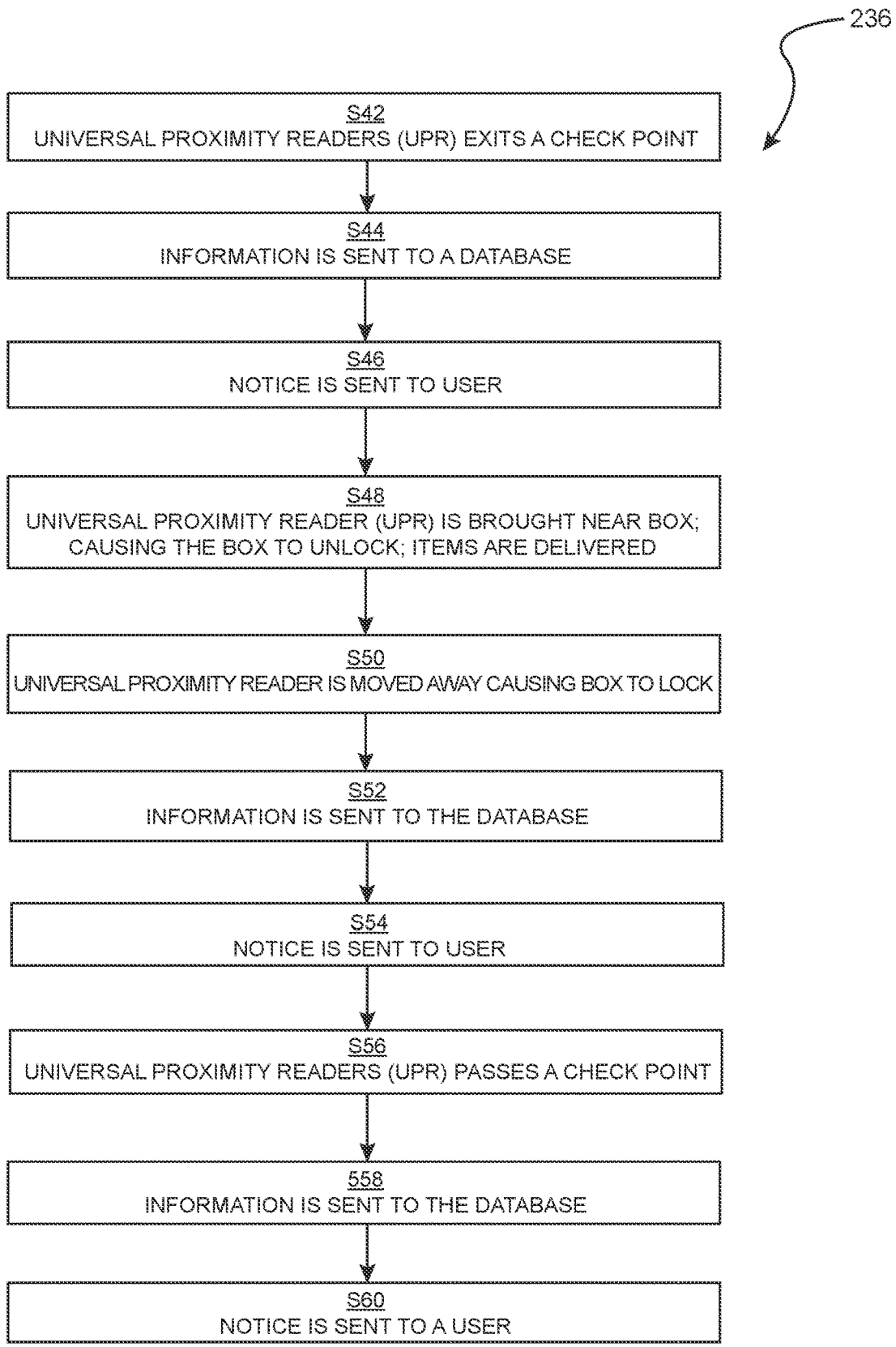
FIG. 13 is a flowchart illustrating a method of securely delivering an item in accordance with the present disclosure.

FIGS. 11 through 13 are flowcharts that illustrate various aspects and steps of methods in accordance with the present disclosure. It should be understood that the order of the steps shown in the figures and describe herein and in the claims is not mandatory (unless specifically stated otherwise) but cited as examples. The order of the steps may be rearranged in accordance with the present disclosure. FIG. 11 is a flowchart which describes a method 232 of activating universal proximity sensors 42 (also referred to as a delivery proximity sensors 42). The term universal proximity sensor 42 is also used because the universal or delivery proximity sensors 42 may be configured to open all deposit boxes 22, 220 or all deposit boxes 22, 220 located within a defined area (hence it being a "universal" proximity sensor) as opposed to a users proximity sensor 40 which generally is associated with a single delivery box 22, 220. However, in some embodiments, the user's proximity sensor 40 may also be associated with multiple delivery boxes 22, 220 associated with a user (especially when the user is an entity rather than a real person).

As shown in step S10, a delivery service (which may include a government entity such as the U.S. Postal Service or any other delivery service whether public or private) receives universal proximity sensors 42 (as shown in FIG. 1). In step S20, the delivery service may use barcodes on the proximity sensors 42 to swipe and download information and uniquely assigned each proximity sensor a particular delivery point or geographical zones such as, a zip code with the server or database 56. In step S30 the universal proximity sensor 42 may be registered via a computer 58 wireless device 104 as shown in FIG. 1 or any other suitable device. In step S32 the universal proximity sensors 42 may be distributed and associated with the piece of equipment 44 and or specific delivery personnel. For example a universal proximity sensor 42 may be associated with a specific delivery person or a vehicle 44 or bag 44 as shown in FIG. 1 or 3. Information regarding the proximity sensors 42 in steps S20-S32 can be entered into a computer 58 or other wireless device 104 using an application or computer program which allows the information to be stored on a database or server 56. Once the universal proximity sensor 42 has been registered it may be activated (authorized) and able to communicate with the box proximity sensors 30 within its delivery route, specific delivery point, geographical zone, or ZIP Code. The delivery service can perform the operation of activating or deactivating each delivery proximity sensor 42 as needed.

FIG. 12 illustrates a method 234 in accordance with present disclosure for activating a specific delivery box 22 or box proximity sensor 30 associated with a specific delivery box 22. As shown in step S34, a user obtains a box security system which may include a deposit box 22 already configured to be in accordance with the system 20 or a kit which (as discussed above) may allow a retrofit of the existing mailbox or other deposit box to be upgraded to contain features associated with the present system 20. As shown in step S36 user may download (or access) from a database 56 or server 56 an application or computer program onto a users device 104 or computer 58. In step S38 the user may then use the application or program to register the box proximity sensor 30. The registration may include entering a user's information such as name, address, serial number of the deposit box and/or box sensor 30, user's proximity sensor 30 serial number, location of the deposit box 22 and the like. In step S40, the user may then fit the retro kit to an existing deposit box 22 or install a deposit box 22 in accordance with present disclosure. The user, delivery service, and a system 20 operator may activate and deactivate proximity sensors 30, 40, 42, 50A and 50B as needed.

FIG. 13 illustrates a method 236 of delivering an item in a secure manner in accordance with the present disclosure. The following discussion is made with reference to both the flowchart of FIG. 13 and the system shown in FIG. 1. At step S42, a universal proximity sensor 42 exits a checkpoint as detected by the location proximity sensors 50A and/or 50B. As shown in step S44, information that the delivery equipment 44 has passed one of the exit proximity sensors 50A or 50B is sent to the database or server 56. Optionally, as shown in step S46, a notice can be sent to a user's computer 58 or device 104 regarding the passage of the delivery equipment 44. As shown in step S48, when the universal proximity sensor 42 is brought near the box proximity sensor 30 the locking mechanism 32 will unlock the deposit box 22.

When the universal or delivery proximity sensor 42 is moved away from the box proximity sensor 30, the locking mechanism 32 will revert to the lock position as indicated in step S50, As set forth in step S52, information may be sent to the server or database 56 regarding communication between the universal proximity sensor 42 and the box proximity sensor 30. This information can indicate when the deposit box 22 was unlocked, (indicative that a delivery was made or that items were removed from the deposit box 22), whether the deposit box 22 is currently locked, or any other desired information. In step S54, information may be sent to a user's computer 58 or device 104 or merely stored on the server or database 56 to be accessed by user via the device 104 or computer 58.

At step S56 the delivery service equipment 44 may pass a checkpoint containing the location proximity sensors 50A or 50B after returning from making deliveries. Once the building or property line proximity sensors 50A or 50B detect the return of the delivery equipment 44 by detecting the delivery proximity sensor 42, information regarding the return of the delivery equipment 44 may be sent to the database or server 56 at step S58. At step S60 notice regarding the return of the equipment 44 may be sent to a user. It may be understood that the method does not require that notices be sent to a user, as such steps are optional. In some embodiments, information is stored on the database or server 56 for later access by the user and may or may not be sent to a user.

In some embodiments, the delivery proximity sensor 42 may also contain a GPS transceiver which can transmit wirelessly information to the database or server 56 as to the location of the equipment 44. In some embodiments, one or more of the other proximity sensors 30, 40, 50A, and 50B may also contain or be operatively connected to a transceiver which can transmit wirelessly information to the database or server 56.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An integrated package and mail delivery security system, the integrated package and mail delivery security system being configured to limit access to a delivery box, the integrated package and mail delivery security system comprising:
a lock mechanism, the lock mechanism configured to attach to or be integrated within the delivery box to selectively prevent a door of the delivery box from opening;
the lock mechanism configured to have a locked configuration that prevents the door of the delivery box from opening;
the lock mechanism further configured to have an unlocked configuration that allows the door of the delivery box to open;
the lock mechanism further including a lock body;
the lock body comprising a movable bolt that retracts into the lock body and extends from the lock body to implement the locked configuration that prevents the door of the delivery box from opening and the unlocked configuration that allows the door of the delivery box to open;
a sensor operatively connected to the lock mechanism, the sensor configured to be responsive to authorized delivery personnel and send a signal to the lock mechanism;
the sensor further configured to send the signal to operate the lock mechanism to move the movable bolt to place the lock mechanism in the unlocked configuration that allows the door of the delivery box to open during a delivery of a package and/or mail to the delivery box by the authorized delivery personnel;
a transceiver operatively connected to the lock mechanism and the transceiver configured to transmit information over a wireless network to a system indicating operation of the lock mechanism;
a power source configured to provide electrical or battery power to at least the sensor, the lock mechanism, and the transceiver;
the system configured to receive the information indicating operation of the lock mechanism from the transceiver over the wireless network; and
the system being further configured to transmit a message over another network to a device regarding operation of the lock mechanism,
wherein the device comprises at least one of the following: a computer and a wireless device; and
wherein the message comprises an indication of operation of the lock mechanism.

2. The integrated package and mail delivery security system of claim 1 wherein the device comprises the computer and the computer is implemented as part of a delivery tracking system configured to store data in a database.

3. The integrated package and mail delivery security system of claim 2 wherein:
the device comprises the wireless device and the wireless device being implemented as a mobile phone that implements an application;
the system is further configured to register the lock mechanism by receiving registration information from the device of a user of the lock mechanism through the application; and
the registration information comprises at least one of the following: a user name, a user address, a serial number of the lock mechanism, and a location of the delivery box.

4. The integrated package and mail delivery security system of claim 1 wherein the integrated package and mail delivery security system is configured for operation with at least one barcode.

5. The integrated package and mail delivery security system of claim 1 wherein the system comprises at least one server and at least one database.

6. The integrated package and mail delivery security system of claim 1 wherein the sensor is further configured to operate the lock mechanism to move the movable bolt to place the lock mechanism in the unlocked configuration that allows the door of the delivery box to open during a delivery of the package and/or mail by the authorized delivery personnel by detecting an elements associated with authorized delivery personnel.

7. The integrated package and mail delivery security system of claim 1 further comprising the delivery box;
the delivery box comprising an enclosed space to receive delivery of the package and/or mail;
the delivery box comprising the door that is configured to selectively provide access to the enclosed space and the door further configured to selectively prevent access to the enclosed space; and
a lock receiver configured to be attached to the door of the delivery box, the lock receiver configured to receive the movable bolt.

8. The integrated package and mail delivery security system of claim 1 wherein the sensor is further configured to operate the lock mechanism to move the movable bolt to place the lock mechanism in the unlocked configuration that allows the door of the delivery box to open during a delivery of the package and/or mail by the authorized delivery personnel by detecting a device.

9. The integrated package and mail delivery security system of claim 8
wherein the device comprises at least one barcode; and
wherein the at least one barcode comprises information that relates to a particular delivery point.

10. The integrated package and mail delivery security system of claim 1 wherein the locking mechanism further includes a light configured to operate when the locking mechanism is in the locked configuration.

11. The integrated package and mail delivery security system of claim 7 wherein the lock receiver is configured to be attached to the door of the delivery box with mechanical fasteners.

12. The integrated package and mail delivery security system of claim 1 wherein the lock mechanism is configured to be arranged external to the delivery box.

13. An integrated package and mail delivery security system, the integrated package and mail delivery security system being configured to limit access to a delivery box, the integrated package and mail delivery security system comprising:
a lock mechanism, the lock mechanism configured to attach to the delivery box to selectively prevent a door of the delivery box from opening;
the lock mechanism configured to have a locked configuration that prevents the door of the delivery box from opening;
the lock mechanism further configured to have an unlocked configuration that allows the door of the delivery box to open;
the lock mechanism further including a lock body;
the lock body comprising a movable bolt that retracts into the lock body and extends from the lock body to implement the locked configuration that prevents the door of the delivery box from opening and the unlocked configuration that allows the door of the delivery box to open;
a sensor operatively connected to the lock mechanism, the sensor configured to be responsive to authorized delivery personnel and send a signal to the lock mechanism;
the sensor further configured to send the signal to operate the lock mechanism to move the movable bolt to place the lock mechanism in the unlocked configuration that allows the door of the delivery box to open during a delivery of a package and/or mail to the delivery box by the authorized delivery personnel;
a power source configured to provide electrical or battery power to at least the sensor and the lock mechanism;
a transceiver operatively connected to the lock mechanism and the transceiver configured to transmit information over a wireless network to a system indicating operation of the lock mechanism;
the system configured to receive the information indicating operation of the lock mechanism from the transceiver over the wireless network; and
the system being further configured to transmit a message to a device regarding operation of the lock mechanism;
wherein the device comprises at least one of the following: a computer and a wireless device; and
wherein the message comprises an indication of operation of the lock mechanism.

14. The integrated package and mail delivery security system of claim 13 wherein the device comprises the computer and the computer is implemented as part of a delivery tracking system configured to store data in a database.

15. The integrated package and mail delivery security system of claim 13
wherein the message further comprises an indication that the lock mechanism is currently locked; and
wherein the system comprises at least one server and at least one database.

16. The integrated package and mail delivery security system of claim 13 wherein the integrated package and mail delivery security system is configured for operation with at least one barcode.

17. The integrated package and mail delivery security system of claim 13 further comprising the delivery box;
the delivery box comprising an enclosed space to receive delivery of, or retrieve the package and/or mail;
the delivery box comprising the door that is configured to selectively provide access to the enclosed space and the door further configured to selectively prevent access to the enclosed space; and a lock receiver configured to be attached to the door of the delivery box, the lock receiver configured to receive the movable bolt.

18. The integrated package and mail delivery security system of claim 13 wherein the sensor is further configured to operate the lock mechanism to move the movable bolt to place the lock mechanism in the unlocked configuration that allows the door of the delivery box to open during a delivery of the package and/or mail by the authorized delivery personnel by detecting an elements associated with authorized delivery personnel.

19. The integrated package and mail delivery security system of claim 13 wherein the locking mechanism further includes a light configured to operate when the locking mechanism is in the locked configuration.

20. The integrated package and mail delivery security system of claim 17
wherein the lock receiver is configured to be attached to the door of the delivery box with mechanical fasteners; and
wherein the lock mechanism is configured to be arranged external to the delivery box.

\* \* \* \* \*